Feb. 23, 1965         G. B. KARNOFSKY         3,170,779

ENDLESS CONVEYOR FREEZE CONCENTRATION AND SEPARATION SYSTEM

Filed Nov. 24, 1961         6 Sheets-Sheet 1

INVENTOR.
GEORGE B. KARNOFSKY
BY
his Attorneys

Feb. 23, 1965    G. B. KARNOFSKY    3,170,779
ENDLESS CONVEYOR FREEZE CONCENTRATION AND SEPARATION SYSTEM
Filed Nov. 24, 1961    6 Sheets-Sheet 3
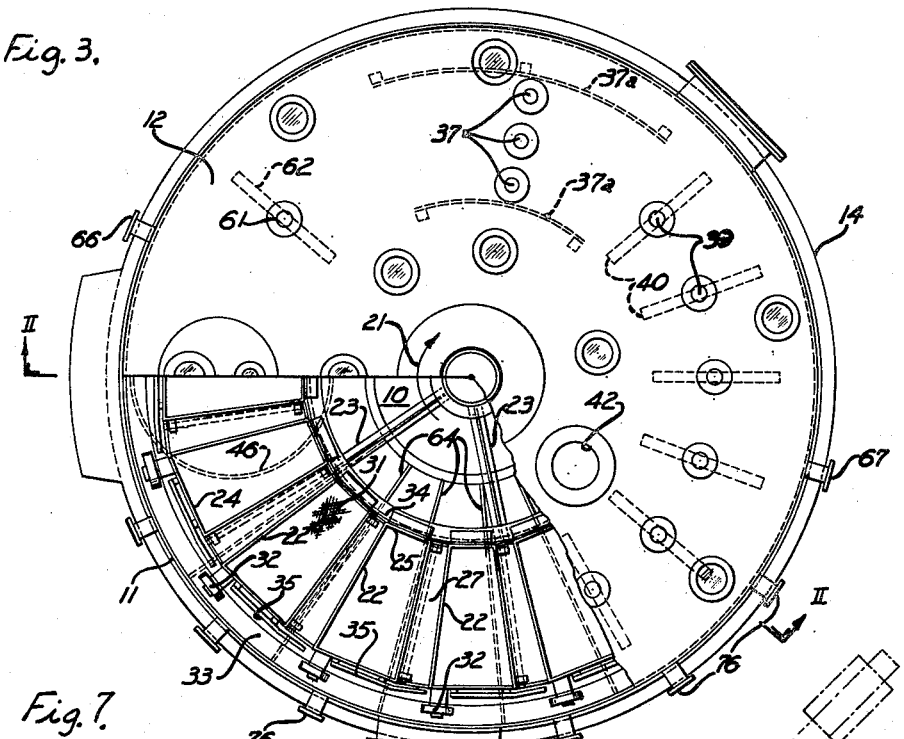
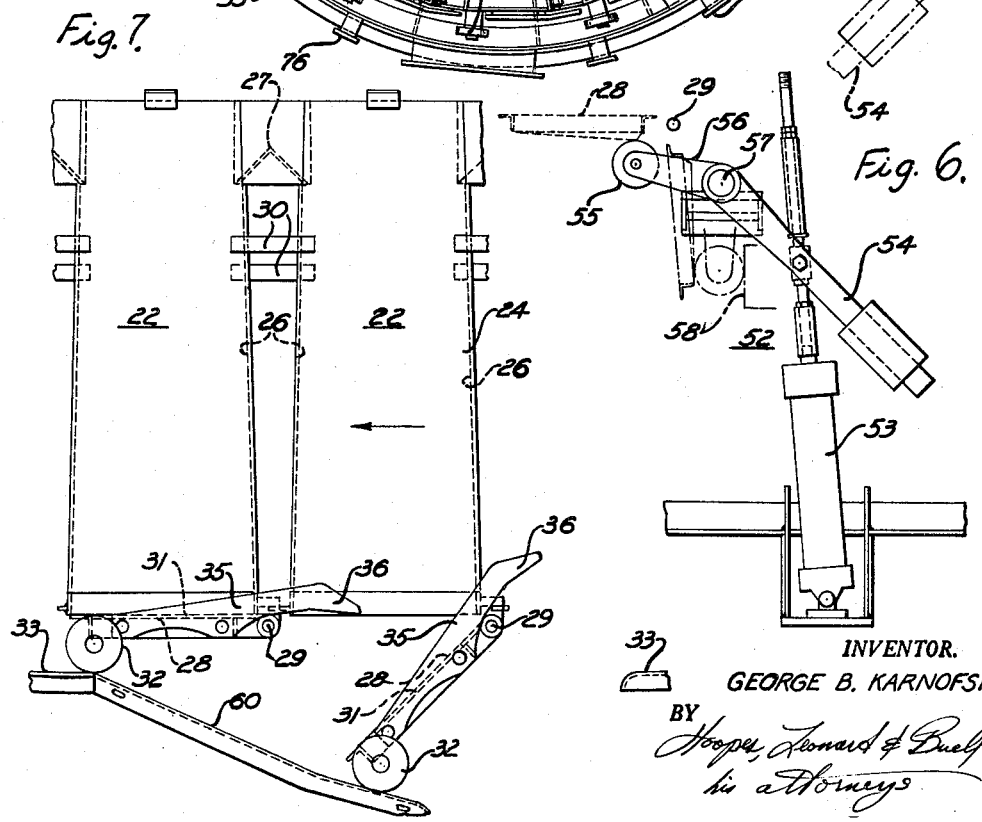
INVENTOR.
GEORGE B. KARNOFSKY

INVENTOR
GEORGE B. KARNOFSKY

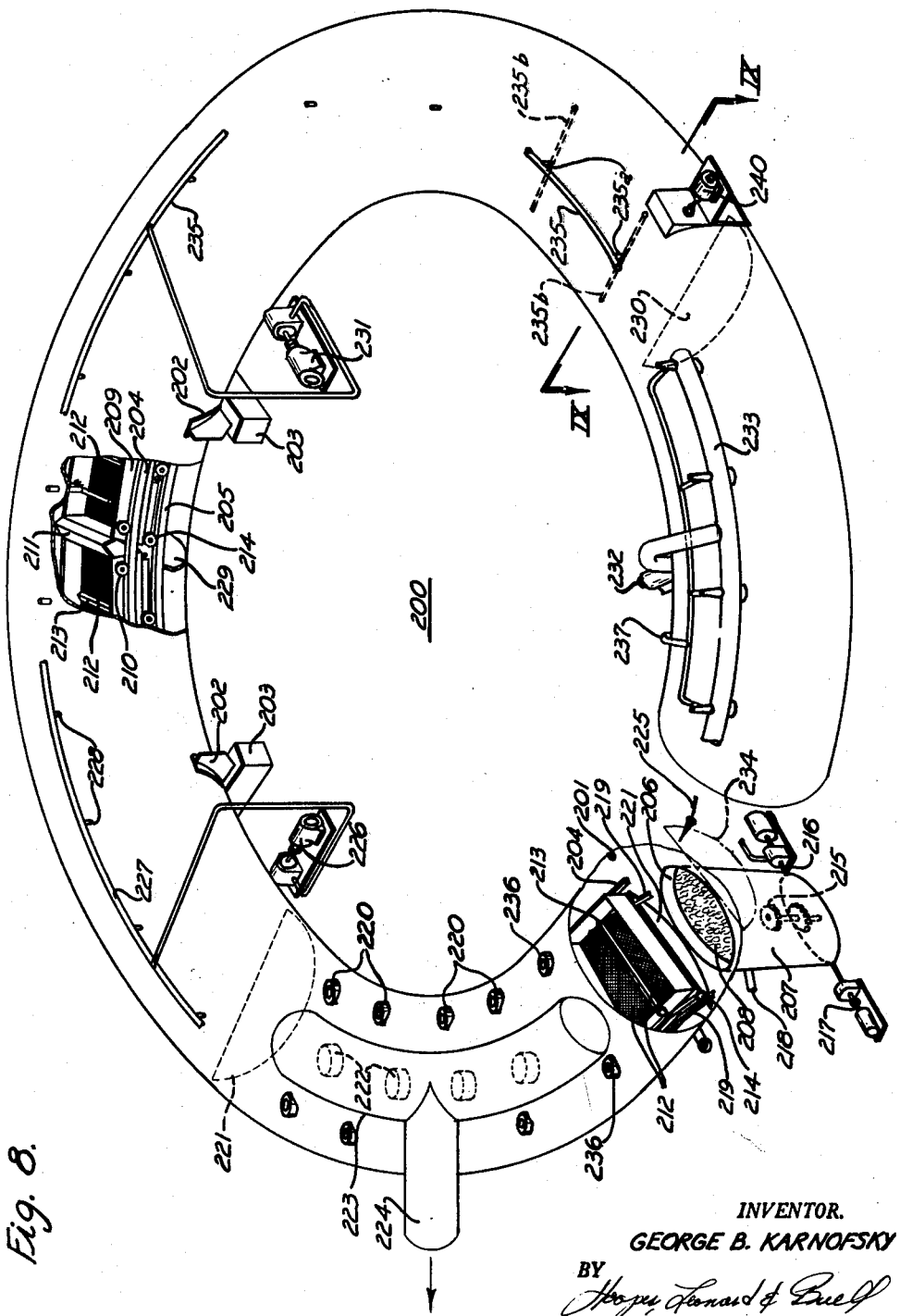

Feb. 23, 1965 G. B. KARNOFSKY 3,170,779
ENDLESS CONVEYOR FREEZE CONCENTRATION AND SEPARATION SYSTEM
Filed Nov. 24, 1961 6 Sheets-Sheet 6

INVENTOR
GEORGE B. KARNOFSKY

United States Patent Office 3,170,779
Patented Feb. 23, 1965

3,170,779
ENDLESS CONVEYOR FREEZE CONCENTRATION AND SEPARATION SYSTEM
George B. Karnofsky, Mount Lebanon Township, Allegheny County, Pa., assignor to Blaw-Knox Company, Pittsburgh, Pa., a corporation of Delaware
Filed Nov. 24, 1961, Ser. No. 154,503
17 Claims. (Cl. 62—58)

This invention relates to a solution concentration and solvent recovery system in which the solution is partially frozen and separated. More particularly, this invention relates to concentration of saline water, fruit juice, or other aqueous solution by partial freezing to produce ice which is washed until relatively solute-free ice remains. This system is particularly applicable to continuous cyclic processes such as set forth in an article by Professor E. R. Gilliland and published in the September 1955 issue of Industrial and Enginering Chemistry, p. 2417 et seq., under the title "Freezing Offers Attractive Process Costwise for Separating Water From Salt Solution," in which ice is formed by adding a water-immiscible refrigerant to the solution causing ice to form and the refrigerant to evaporate, the resulting ice then being washed and finally melted by direct contact with refrigerant vapor from the freezing step, the vapor having been compressed to a suitable higher pressure for the melting step.

The present invention concerns novel means for freezing and washing ice suitable for use in such cyclic processes, or means for washing alone in a continuous system and in connection therewith, reference is made to my Patent No. 2,840,459.

As is well known, water crystallizes in pure form on partial freezing of aqueous saline solutions containing not in excess of 23% salt by weight. Such partial freezing, whether by indirect chilling of the solution, spraying it into a vacuum, or direct contact with boiling refrigerant, produces ice in fine slush form which must be washed to recover a salt-free product. However, handling the ice is not a simple matter; as it drains it tends to become immobile and beds of ice have a tendency to plug during washing.

The present invention relates to a continuous partial freezing and ice washing system suitable for large scale operation in which a permeable and easily washable mass of ice may be formed in place as the freezing is effected, and in which the resulting ice is washed free of residual saline solution in the same apparatus. Flash freezing may be employed in the freezing step and thus effected in a section of the apparatus of relatively small size, and the resulting ice may be easily and efficiently washed with relative movement of beds of such ice before discharge from the system substantially free of any residual saline material.

The illustrated embodiments of this invention may be operated at a pressure not greatly above or below atmospheric pressure utilizing a refrigerant material such as butane, or isobutane. Appropriate heat transfer means may be provided for augmented economy with various regulation and control features adjustable for optimum operation and treatment of waters of greater or less salinity ranging from sea water to brackish water.

Other objects, features and advantages of this invention will be apparent from and are pointed out in the following description and the accompanying drawings, which are illustrative only, in which FIGURE 1 shows a product purification and reject material concentration freeze-washer system embodiment of this invention in a developed view utilizing rotatable apparatus to receive a freeze slurry and wash clean product ice therein;

FIGURE 3 is a plan view of the rotatable device shown in FIGURE 2 with a portion of the lower half of such plan view broken away to show the carrier and cells;

FIGURE 6 is a view in side elevation taken in the direction of arrows VI—VI shown on FIGURE 4;

FIGURE 7 is a view taken along line VII—VII of FIGURE 2;

FIGURE 8 is a view in perspective with portions broken away to illustrate a torus embodiment of this invention;

Figure 1:
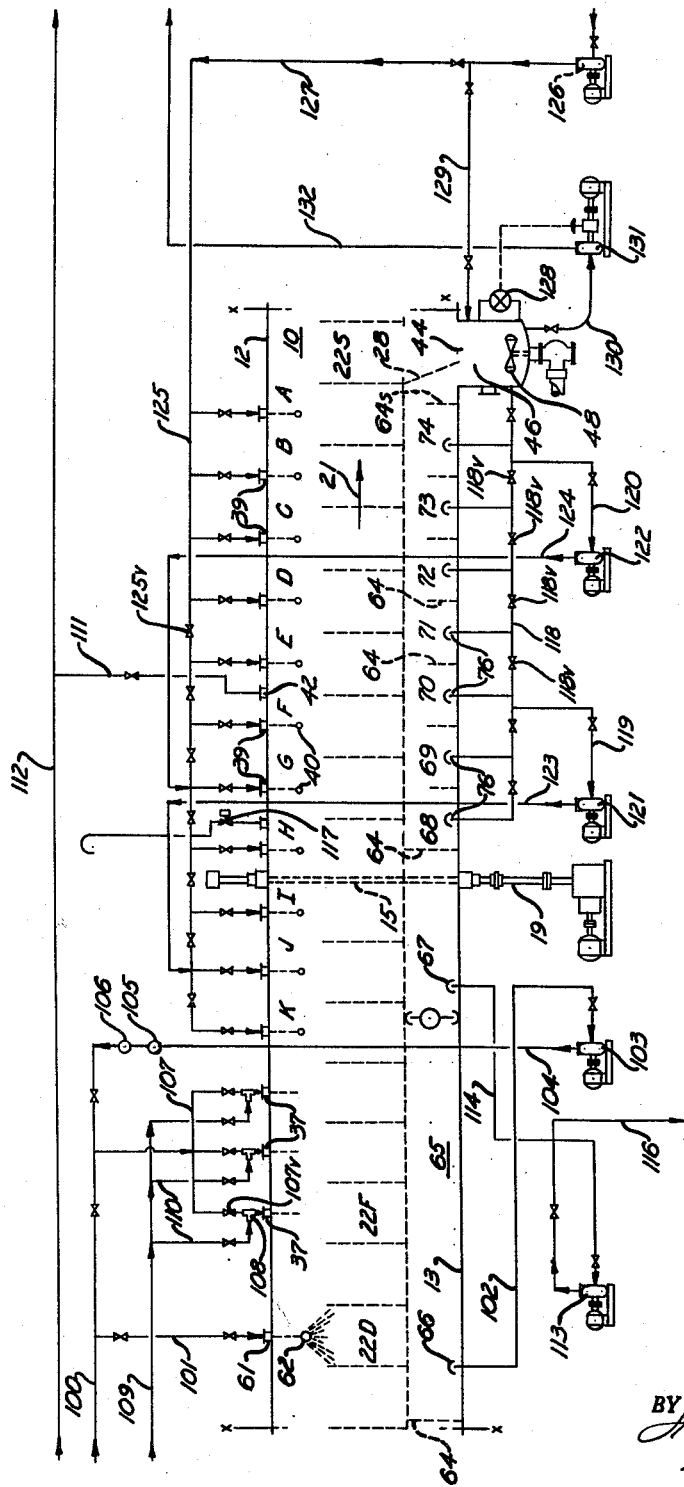
Figure 2:
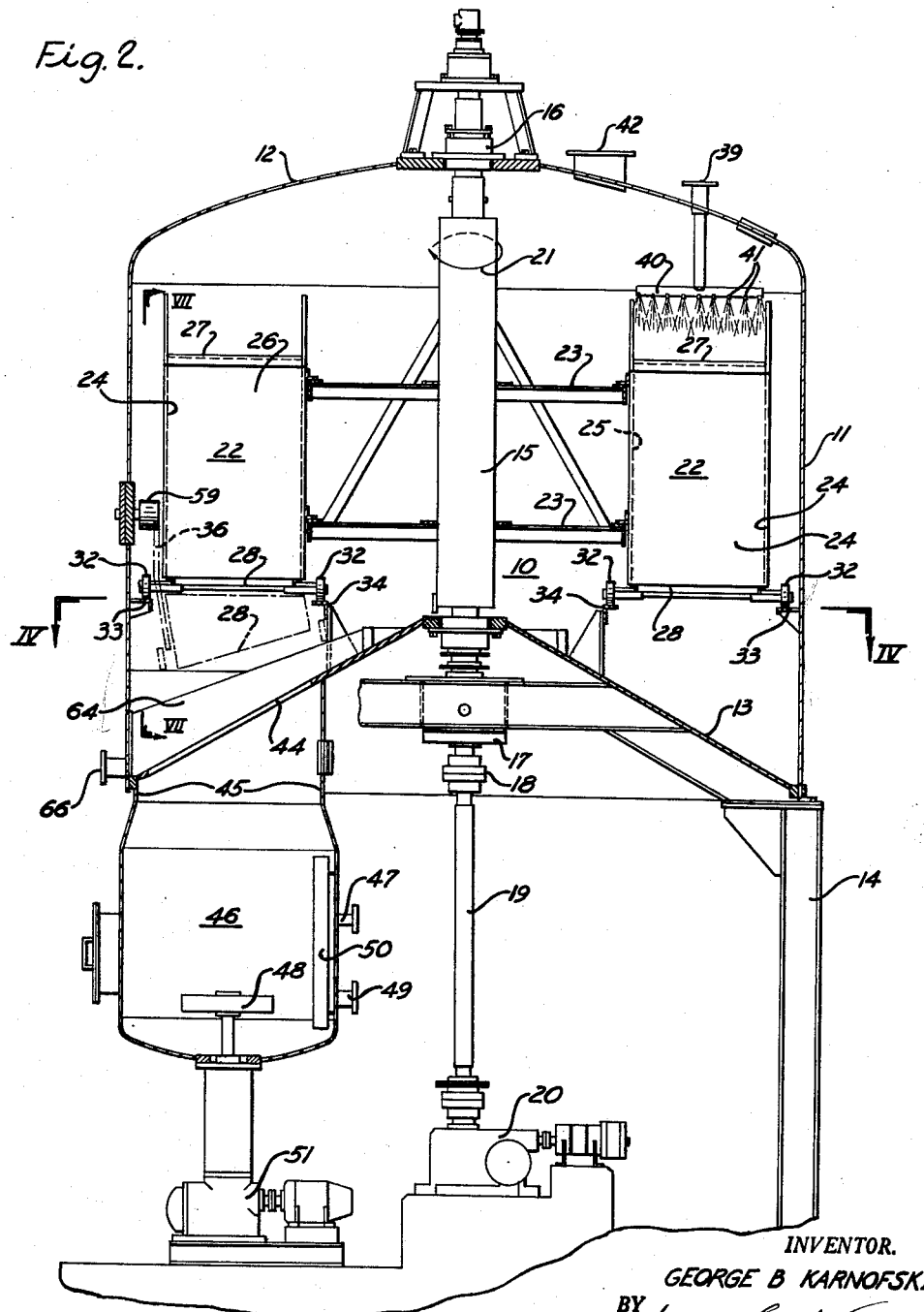
FIGURE 2 is a view in section taken along line II—II of FIGURE 3 to illustrate a rotatable device of the kind shown in FIGURE 1.

Referring to FIGURES 2 to 7, inclusive, of the drawings there is shown therein a rotatable washer device 10 enclosed with a cylindrical casing 11 with a head 12 and a frusto-conical bottom 13 mounted on a structural frame 14. A rotatable vertical shaft 15 extends through the axis of the casing and is journaled at its upper end in a bearing 16 and at its lower end in a supported thrust bearing 17, appropriate seals being provided for such bearings. A flexible coupling 18 connects the lower end of shaft 15 with a drive spindle 19 connected to a motor-reducer drive set 20. Prime mover 20 rotates shaft 15 in the direction of arrow 21 in the illustrated embodiment for the conduct of an operation under this invention and such rotation, as hereinafter described, may be continuous. Or, the rotation of shaft 15 may, if desired, be intermittent, e.g., the shaft may be slowed down or halted momentarily at each interval of about 20° of rotation in the case of the particular example illustrated. Shaft 15 is rigidly connected to a rotatable carrier having cells 22 joined in circumferentially endless fashion and connected to shaft 15 for rotation therewith by carrier frame members 23. The cells 22 together have a substantially continuous circumferential outer wall 24 and a substantially continuous circumferential inner wall 25, both walls being somewhat higher than the respective radial walls 26 of the individual cells. The adjacent radial walls 26 of an adjoining pair of cells 22 are bridged by a gable cap 27. The cells below the gable caps 27 are joined by straps 30 welded or otherwise affixed to the circumferential walls.

The joined cells comprising the carrier are each open at the top and openable at the bottom, the respective bottom of each cell normally being closed by a door 28 hinged by a pintle 29 at the trailing edge of each cell. Each door is provided with a rigid frame having a perforated plate 31 to act as the closure for the bottom of the cells and to support ice deposited therein while permitting liquid to drain out into frusto-conical bottom 13 of washer 10. Thus, a porous bed of ice may be collected in the cell and supported on the doors between a freezing-and-slurry-feeding inlet station and a product-ice-discharge outlet station along the path of rotation of the carrier. The front of each door is provided with a pair of rollers 32 at the corners thereof to ride respectively on outer track 33 and inner track 34 to maintain the door bottom in normally closed position between such inlet and outlet stations. Each door is provided with an operating lever 35 rigidly connected thereto and having a rearwardly extending end 36.

A slurry of saline water and ice is simultaneously formed and collected in the cell 22 beneath the radial set of feed inlets 37 shown in head 12. Preferably, the inlets 37 have the form of mixing nozzles through which saline water and an immiscible liquid refrigerant are sprayed into the cells to thus flash-freeze a portion of the water and evaporate the refrigerant, the evolved vapor of which is withdrawn. Preferably, the apparatus operates continuously while on stream and the flows of materials to and away from device 10 are in equilibrium for a given operation. At various stations along the endless path of each cell there is a nozzle inlet 39 through which suitable piping is connected to a radially extending wash nozzle 40 within casing 11 above the cells to apply wash liquid to each cell as it passes beneath the respective nozzles 40. It is usually preferable to apply such wash liquid in sufficient amount to keep each cell flooded throughout the operation substantially to the full height that might be occupied by product ice therein so that the washing will not disturb the stability of the permeable bed of ice formed in each of the cells. Each nozzle 40 is provided with generally downwardly directed openings 41 for such wash liquid.

The direct flash freezing of the saline water feed to a washer device of this invention may be preferred because it reduces equipment cost and transport of ice. Experimental laboratory work thereon is set forth in the Research and Development Progress Report No. 40 (PB 161819), Office of Saline Water, U.S. Department of Interior. Further, product ice in a sufficient quantity of water forms a slurry which is pumpable so that such a product ice slurry may be made outside washer device 10 and delivered thereto by a pump; or relatively drained but unwashed product ice may be discharged directly into a cell in device 10 for washing therein in accordance with this invention.

Refrigerant vapor created in the flash freezing of the product ice in the freeze slurry fed through inlets 37 exits from the interior of casing 11 through a vapor outlet 42. A discharge opening 44 to empty each cell in turn is provided through the imperforate bottom 13, the tracks 33–34 being discontinued, or lowered, relative to opening 44 to enable the door 28 of each cell 22 to open above discharge opening 44 and empty out its washed product ice with any fresh wash water remaining therewith. Such product ice of selected specification falls through opening 44 into a conduit 45 communicating with the interior of a product ice sump 46. The cells need not be drained entirely before they are emptied as it is convenient to transport the product ice in slurry form with recycled product water for subsequent melting. To facilitate this, additional product water may be pumped through an inlet 47 into sump 46 for mixing with product ice therein, with an agitator 48 if desired, to form a pumpable product slurry which passes to the outside of sump 46 through a product slurry outlet 49. A baffle 50 within sump 46 assists in the mixing of ice and water. A prime mover 51 operates agitator 48.

Figure 4:
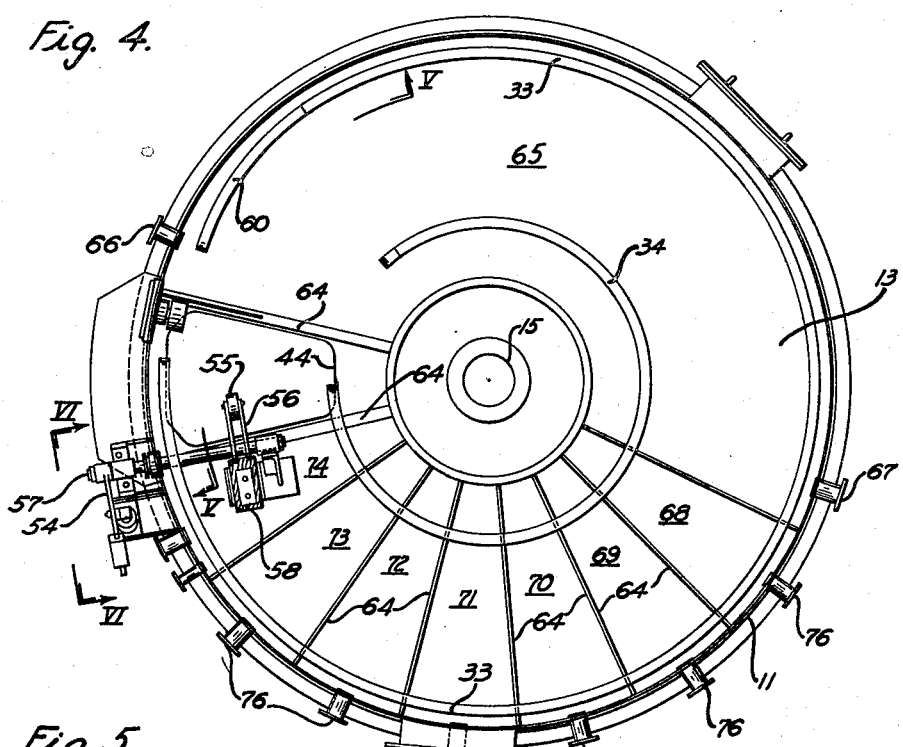
FIGURE 4 is a plan view taken along line IV—IV of FIGURE 2.

As shown in FIGURES 4 and 6, a door snubber 52 is positioned on the approach side of discharge opening 44 adjacent the tracks 33–34. Snubber 52 comprising a snubber cylinder 53 and an adjustably weighted arm 54 normally in "up" position shown in outline in FIGURE 6 with a snubbing roller 55 rigidly connected to arm 54 by extension 56, and pivotal therewith about a transverse shaft 57 fixed in journal bearings positioned to each side of snubber wheel 55. Hence, as the track ends by being discontinued on the approach side of opening 44, the door 28 of that cell 22 moving into the discharge station will open without material swinging because of the engagement of the bottom of the door by roller 55 causing arm 54 to move counterclockwise as viewed in FIGURE 6 until the roller comes to rest against bumper block 58 with the bottom of the respective cell fully open for unobstructed gravity emptying of that cell by discharge of its washed ice. In that connection, it will be noted that the radial walls 26 of the cells 22 diverge somewhat in a downward direction, such downward divergence being enough for the product ice and any adherent liquid therewith to free itself by its own weight immediately upon the door being opened so that it will fall into sump 46 from the discharging cell.

Figure 5:
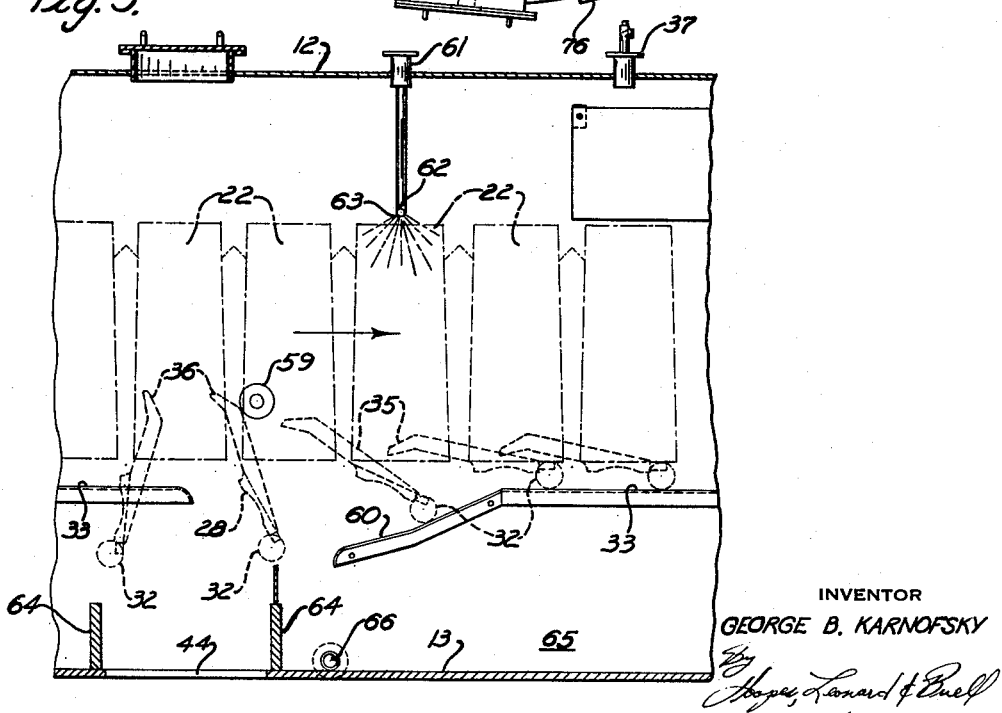
FIGURE 5 is a view taken in the direction of line V—V of FIGURE 4.

As a cell 22 advances from the left hand station shown in FIGURE 5 over discharge opening 44 to the position on the right of that figure, a cam roller 59 engages end 36 of the opened door 28 and raises it sufficiently to place the rollers 32 of that door on ramps 60 of the respective tracks 33 and 34, which reclose the door 28 and the cell. Further advancing movement of that cell brings it to a defrosting station position where there is a defrosting nozzle 62 having openings 63 therein which spray the walls of the emptied cell 22 with a liquid suitable to melt, or dissolve, and remove adherent ice from the walls of that cell before fresh slurry is fed thereto at the succeeding inlet station 37. It is preferable and advantageous to supply the feed of saline water to the defrosting nozzle 62, this being the warmest saline water available. After such defrosting water drains into its compartmented part of bottom 13, it is circulated to the flash-freezing nozzles 37. It will be apparent that since freezing ice from salt solution requires temperatures below the freezing point of pure water, the ice and cell walls are supercooled at the feed inlet with respect to the subsequently sprayed salt-free wash water, a portion of which freezes thereon, until the walls have been warmed to 32° F. This additional ice is removed from the cell walls at such defrosting station which inhibits ice accretions stuck to the cells.

As each emptied and defrosted cell passes beneath the nozzles 37, it gradually fills with a slurry of concentrated saline water and ice crystals formed by partial freezing of the solution. From the nozzle 37 where filling begins, saline liquid may be supplied at a rate exceeding the drainage rate through the permeable ice crystals collecting on the perforated plate 31 to promptly form a shallow pool trapping and detaining any liquid refrigerant in the cell until it is completely evaporated, thus preventing escape of such liquid refrigerant into the bottom 13. With the use of normal butane or isobutane for the refrigerant, the operation can be conducted in device 10 and associated equipment in the neighborhood of atmospheric pressure, greatly reducing cost of equipment, expense of operation and promoting safety. Further, separation of refrigerant from the materials being treated and/or flowing through the apparatus is enhanced because such a refrigerant is immiscible in water. On the other hand, operations also may be conducted under a system of this invention at superatmospheric pressures, or under vacuum conditions, and/or with refrigerants which are miscible in water.

It will be noted that the circumferential walls 24 and 25 extend above the gable caps 27 and there at least are circumferentially continuous. Overfilling of the cell beneath the nozzles of station 37 may occur and the slurry may be permitted to overflow the gable caps at the top or the radial walls of that cell and will simply pass into the adjoining cells. Further, arcuate shields 37a radially spaced from each other are suspended from the top of casing 12 so as to bracket the nozzles 37, the shields 37a passing just inside of the circumferential walls 24 and 25 respectively to guide the filling without spilling of the cells by the slurry discharged from such nozzles. Such "heaping" helps to compensate for shrinkage of the product ice, which occurs in each freshly filled cell as it advances (clockwise as viewed in FIGURE 3) toward the discharge outlet 44, and maintain each cell filled. Further, it has been observed that the slurry issuing from the nozzles 37 will distribute itself evenly within cell during filling, because it acts substantially as a liquid in matters of distribution and self-leveling. Slurry feed nozzles like nozzles 37, may be located over more than one cell 22, as indicated in FIGURE 1, to provide a sufficiently large ratio of total horizontal area of draining ice bed to the excess of solution not frozen so that the excess may drain away through the consolidated but permeable ice bed substantially as fast as supplied, the cells filling essentially with consolidated ice and such liquid hold-up as the ice bed retains to keep the interstices between particles of such product ice preferably flooded. However, in the operative form of the device of washer 10 illustrated in FIGURES 2 to 7, there is but a single radial set of nozzles 37 utilized to supply feed slurry to a single cell 22 at one time sufficiently rapidly to fill the cell to overflowing. If desired, the ice beds in each cell may be tamped but in general, the force of descent and distribution of the feed slurry will produce a stable and relatively compact, permeable ice bed in each cell leaving the feed area. This bed is maintained substantially flooded from the time it is formed until discharged from the cells. The initial flooded state is caused by the excess of saline water in the feed slurry resulting from the flash freezing action and any addition of water to the slurry that may be made. Flooding of the bed is maintained thereafter and wash liquid is applied as each cell moves around on the carrier towards the discharge station 44. Fresher wash water displaces the concentrated brine and weaker saline water in a series piston-like displacement actions, the water washed out draining into bottom 13, so that only washed ice flooded with substantially salt-free water remains when the cell reaches the discharge station.

The bottom 13 of washing device 10 is radially divided by a series of stage divider walls which extend between the lower outer end of bottom 13 and the inside of the vertical portion of casing 11 and a peripheral inner bottom wall. Two of such walls 64 extend transversely across each end of the opening 44. The wall 64 across the departure end of opening 44 and the next stage divider wall 64 thereto in a clockwise direction as viewed in FIGURE 4 are preferably higher than the remaining walls 64 in bottom 13 in order to facilitate impounding liquid draining into compartment 65 between those two first-mentioned walls to provide a reservoir therein permitting liquid level control means to be used for withdrawal of concentrated saline solution as relatively cold reject water through a drain outlet 67. Such cold reject water may be conveniently used in a heat interchanger (not shown) to help pre-cool the fresh saline water feed before the latter is introduced at the nozzles 37 for partial flash-freezing and slurry feeding. The remaining compartmented portion of bottom 13 may be divided by such walls into compartments respectively numbered 68 to 74 inclusive and respectively in a clockwise direction when viewing FIGURE 4 for separate drainings through drain outlets 76 and from thence such draining liquid may be passed into a manifold, or separately handled where it is desired, to provide a greater number of stage separations of drained liquid from the product ice in the cells respectively and sucessively above each compartment between each pair of walls 64. In general, the respective compartments other than compartment 65 will be kept fully drained by self-priming pumps such as those illustrated in FIGURE 1. In the wash liquid draining portion following compartment 65, such drained liquid from each compartment will normally be advanced in a countercurrent (counterclockwise in FIGURE 4) direction, that is, countercurrent to the clockwise path of movement of the respective cells 22 as indicated in FIGURE 3, except that the drained wash liquid normally will not be pumped to the nozzles of a station above compartment 65.

An exemplary operation of a system of this invention is schematically illustrated in FIGURE 1 wherein parts generally corresponding in structure and functioning to apparatus described above are provided with the same reference numerals, respectively. Therein, saline water such as sea water or brackish water, preferably cooled by indirect heat exchange substantially to a temperature about 32° F. is fed through a pipe 100, a branch 101 and a defrosting inlet 61 to defrosting nozzle 62 wherein a cell 22D, at the defrosting station at that selected time, is rid of whatever frost may have accumulated on the walls of the cell in the course of the single round it had just completed. The saline water effluent from nozzle 62 is thereby further cooled and drains into compartment 65, mixing therein with concentrated saline solution draining from the cells above that compartment. From compartment 65, saline solution is removed through a drain 66 and a pipe 102 whence it passes to a centrifugal feed pump 103 and a pipe 104 through a flow controller 105 and a flow indicator 106 to a feed inlet manifold 107 leading selectively to one or more of three branches with valves 107V therein whereby it is delivered at a regulated and predetermined rate to respective liquid ejectors 108, the delivery ends of which communicate with the interior of the respective nozzle inlets 37 being used. The rate of saline water flow to the ejectors may exceed the original feed rate through pipe 100 to any desired extent by regulating recycle of liquid from compartment 65. Liquid butane, in predetermined amount required to freeze any selected fractional portion of the feed saline water, is withdrawn from a pressurized butane condenser system and passes through a pipe 109 and respective branches 110 with valves therein to the interior of the respective hydraulic ejectors mixing and freezing nozzles 108 being used where it mixes with the saline water feed and is discharged through feed inlets 37 directly into the interior of casing 11 and the cell or cells beneath the operating nozzles, causing the butane to flash into vapor which thereby is removed through vapor outlet 42, a valved branch line 111 and a pipe 112 leading to the butane vapor pressurizing compressor and/or to a butane condensation system (not shown), where the butane is liquefied and readied for return preferably to the same or a like process operation. The conditions of flow, temperature and pressure are selected to provide flash freezing of any specified part of the water in the saline water feed to nozzles 37 producing product ice free of salt and concentrated reject liquid in the form of saline water of greater salinity. For example, original sea water containing 3% salt may be concentrated to 6% salt content by weight by freezing half of the original water content to ice. The ice and concentrated saline water form a slurry which is jetted into the cells from each set of nozzles 37 over each of the filling stations in a continuous stream, the cell 22F being shown as successively moving to the two more feed stations with nozzles 37 thereover before being completely filled. Draining of concentrated saline water goes on continuously through the permeable ice bed product formed in the cells during such feeding during the station-to-station movement of the carrier as shaft 15 moves while the cells are above compartment 65. The ratio of saline water to butane may be adjusted by varying the amount of recycled saline water, butane preferably being held to a constant, to insure that sufficient saline water remains in liquid state to provide a self-distributing and self-leveling feed slurry which will form a stable compact bed in each cell passing beneath the three stations comprising the feed area in the illustrated FIGURE 1 development, and the same principle applies when the washer 10 has but a single feed station and set of nozzles 37 to fill a cell 22 therebeneath as in the device of FIGURES 2 to 7. Further rotation of the cells 22 to the right in FIGURE 1 brings them beneath reject water wash liquid entering nozzles 40 through inlets 39, such reject wash liquid being withdrawn through a drain 67 ad pipe 114 by reject water pump 113 and a pipe 116 to a butane separator (not shown) for removal of any entrained butane and from thence to waste preferably after indirect heat exchange with the incoming saline water feed. Safety venting of the interior of casing 11 may take place through a normally closed valve 117.

The compartments 68 to 74, inclusive, normally act only as collecting funnels without impounding liquid therein. The liquid leaves such compartments by respective drains 76 which feed into a manifold 118. Closing of any one of the respective valves 118V in the manifold 118 enable a selectable connection to be made between such wash liquid drain compartments and one or the other of the suction lines 119 and 120 respectively of the centrifugal stage pumps 121 and 122. Such pumps deliver wash liquid respectively to pipes 123 and 124 which deliver to a wash liquid manifold 125 at different points therealong, valves 125V in manifold 125 enabling any number of the inlets 39 and their respective nozzles 40 to be connected selectively to the respective pumps. Generally, wash liquid in the form of product water at a temperature in the neighborhood of 32° F. is pumped by a centrifugal pump 126 through a pipe 127 into the end of manifold 125 adjacent inlet 39 nearest to the discharge station above discharge outlet 44, such wash liquid, as shown, entering cells respectively beneath the four nozzle stations 39 marked A, B, C and D to the right of the valve 125V farthest to the right. Assuming the valve which is third from the left in manifold 118 as shown in FIGURE 1 to be the closed valve 118V, such wash water after percolating through the ice drains into compartments 71 to 74 inclusive and is drawn into suction line 120 of a self-priming stage pump 122 and from thence passed to the nozzles 40 through the inlets 39 in positions E, F and G as recycle wash water wash liquid draining into the compartments 68, 69 and 70 is withdrawn by suitable arrangement of the valves shown into a self-priming stage pump 121 and from thence pumped to inlets 39 and the respective nozzles 40 thereof in positions H, I, J and K as further recycled wash liquid of increasing salinity. Some of such further recycled wash liquid passes into compartment 65 and is withdrawn through drain 67 principally and some of which will drain into one or more wash liquid compartments to the right of compartment 65. In general, the movement of wash liquid due to the recycling thereof is countercurrent to the direction of movement of cells 22. It will be apparent that irrespective of the positioning of a stage divider wall 64, the valving in the respective lines is such that one or more compartments in the group 68 to 74, inclusive, may be made to coact as a single compartment for the purpose of furnishing recycle wash liquid to a stage pump thereby providing a further control to enable the system to operate appropriately on materials of different characters or salinity.

As each cell moves into position 22S at the discharge station, its door 28 opens and product ice therein drops into sump 46 where it is accompanied by any liquid remaining in that cell, or draining to the right of stage divider wall 64S. A level control 128 is provided for sump 46 to which product water may be supplied through a pipe 129 to mix with product ice in the sump and form a readily pumpable slurry, such slurry passing to a suction line 130 and a self-priming centrifugal pump 131 from whence it is removed through delivery pipe 132 as specification product partially in ice form to equipment or a place where the ice will be melted to yield specification product water. As will readily be understood, flow controllers and other instrumentation may be applied to flows through the various pipes and lines in the operation just described for automation of the operation when the device is on stream and flows therein are in equilibrium for the making of specification product which in this case, is potable water or at least water having its salinity reduced to some other specified standard in relatively large quantities at economical cost in a continuous operation.

FIGURE 8 illustrates in schematic perspective a toroidal embodiment 200 of this invention operating on the principle of the previously described embodiment herein, but substantially without countercurrent progress of the wash liquid. Therein, a ring casing 201 which is cylindrical in cross section is supported in fixed position in structural saddles 202 mounted on footers 203. Within casing 201 there is an upper set of wholly circular tracks 204 and a lower set of arcuate tracks 205 which are discontinuous in the immediate vicinity of a discharge station 206 having a sump 207 into which washed product ice 208 is discharged. The upper set of tracks support open topped vertically walled cells 209 the opposite sides of which cells have support rollers 210 to ride on the inner and outer upper tracks 204. The cells 209 are suitably joined together to form a continuous ring for rotation along the support tracks 204 and gable caps 211 are provided to cover the transversely extending space adjacent downwardly diverging cell walls.

The bottoms of the cells are each closed by a pair of perforate doors 212, the front door being hinged to the lower edge of the front radial wall of the cell and the rear door having its hinge connected to a bar 213. Thus, each of doors in each of the cars is hinged about a transversely extending axis at the front of each door. Door rollers 214 at each of the rear corners at each pair of doors ride on the lower inner and outer tracks 205. As each car is moved into the discharge station, the doors 212 thereof fall open upon the wheels 214 coming to the ends of the inner and outer tracks 205 on the approach side of solids discharge station 206, causing the product ice 208 to be discharged therefrom into sump 207. Such product ice with product water added through pipe 218 or the equivalent, is mixed by an agitator 215 and pumped as a slurry through an outlet 216 from the sump for melting of the product ice and recovery of the melt, the agitator being moved by a prime mover 217.

Ramps 219 on the departure side of station 206 reengage the rollers 214 and close the doors of each cell as it moves to the next station beyond station 206. The ring of cells may be moved by an endless cable or chain wrapped about the higher outside wall of the cells 209, which it grips by friction, and driven by drums or sprockets engaging a lateral loop in the chain between adjacent idler sprockets as shown on the drawing. Thus, an electric motor 240 with suitable reduction gearing may be used to drive a sprocket 241 engaging an offset loop of a chain 242 in the reaches between two idler rollers 243. The cable chain 242 engages the outer circumferential wall of the cells 209, a channel 244 being provided as a guide groove on each car for such cable. The movement of the cable may be continuous at uniform speed, continuous with recurrent variation of speed and/or continuous with intermittent movement depending upon the control selected for utilization with the motor 240 and its speed reducer.

Figure 9:
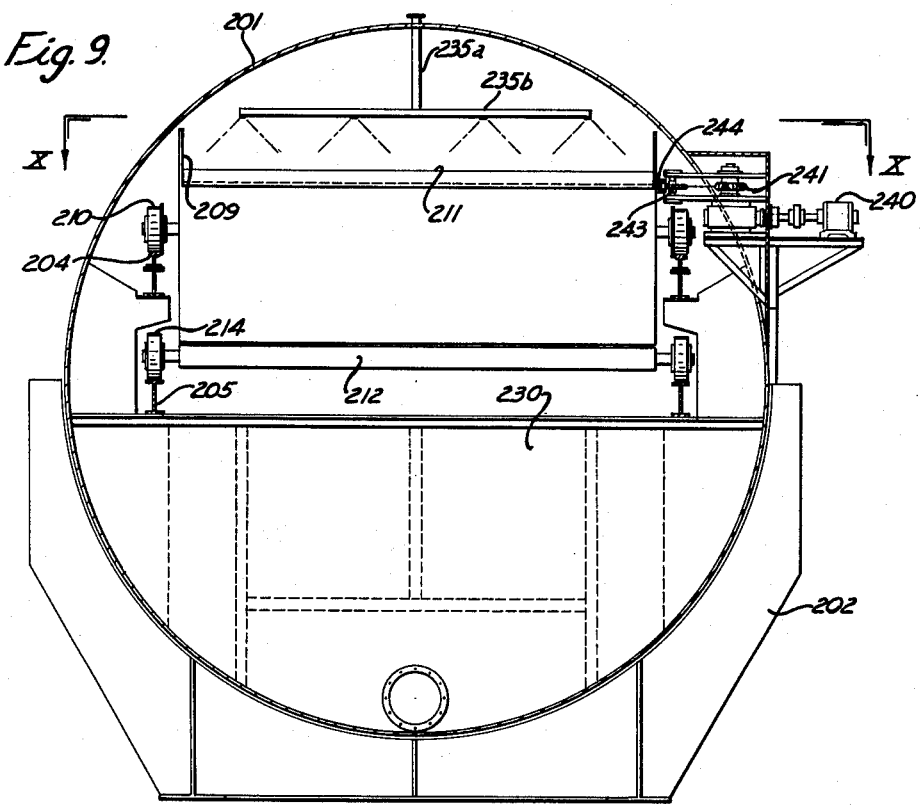
FIGURE 9 is a sectional view taken along line IX—IX of FIGURE 8.
Figure 10:
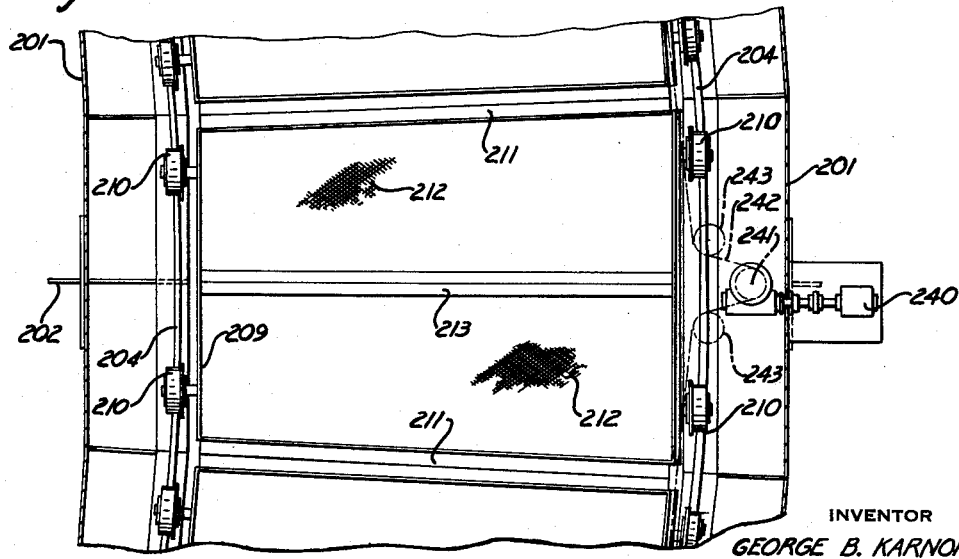
FIGURE 10 is a view in section taken along line X—X of FIGURE 9 with portions of the casing removed to show the drive for the toroidal embodiment.

As each cell advances from station to station beneath the radial sets of nozzles 220, freeze slurry is jetted thereinto, filling the cell or cells beneath with the liquid draining through the perforated plates comprising the bottoms of the cell doors drains into the bottom of casing 201. The bottom of casing 201 is divided into arcuate compartments by transversely extending stage dividers 221. Butane vapor resulting from the flash freezing caused by the pressure ejection mixing nozzles jetting liquid butane and dilute solution through inlet nozzles 220, is removed by vapor outlets 222 connected to a manifold 223 and pipe 224 leading to a butane treatment and recovery system (not shown). As each cell progresses in the direction of arrow 225, the ice therein is washed on the other side of stage divider 221 by wash liquid pumped by a prime mover 226 which passes through a manifold 227 into wash liquid nozzles 228 about the cell cars for washing in the manner heretofore described, further washing occurring in further compartment on the departure side of further stage dividers 229 and 230. The drained liquid in the compartments between stage dividers 221 and 229 is recycled to the same stage by self-priming pump 226. Similarly, self-priming pump 231 recycles liquid drawn from the compartment between dividers 229 and 230 to that stage and compartment through manifold 235, nozzle pipes 235a and spray bars 235b and a similar action is provided by pump 232 through its delivery pipe and manifold 233 to the compartment extending between stage divider wall 230 and the stage divider 234 on the approach side of discharge outlet station 206. In the stagewise washing illustrated in the embodiment of FIGURES 8 to 10, substantial change in the composition of the recycle wash liquids in each of the respective stages may be controlled and regulated by bleeding a small amount of the liquid draining into each of such compartments away from the system and replacing it with recycle wash liquids from any suitable source more closely approaching the product specification of the product ice when melted, respectively. On the other hand, the drained liquid in the respective compartments may be caused to move counterclockwise by appropriate piping connections with pump 232 discharging into manifold 235 and pump 231 discharging into manifold 227, in a manner comparable to the mode of operation illustrated in FIGURE 1. A pair of defrosting nozzles 236 may be provided in advance of the flash freeze and feed slurry nozzles 220. Fresh water of product specification which may be required as wash water make-up may be added to manifold 233 through pipe 237.

Although not illustrated herein, the equipment items utilized in a practice of this invention preferably are insulated to inhibit transfer of heat through the walls of the various equipment items and connecting piping that may be utilized in non-heat exchange portions thereof. And, appropriate covered accessways may be provided such as handholes, manways, serviceways, light and sight glasses in the apparatus at appropriate locations. Further, although the exemplified operations deal principally with the recovery of fresh potable water from sea water, the system of this invention may be operated instead to produce a concentrated salt solution, or concentrated fruit juice, as the principal product of the operation, using suitable wash liquids and refrigerants, which may be other than those herein named. Still further, the freeze ice formation and ice washing phases instead of being conducted from start to finish in a unitary piece of equipment, may be provided preferably in succeeding pieces of interconnected items of equipment.

Various changes may be made in details of the illustrated embodiments and other embodiments, conditions of operation and arrangements of valving and/or piping provided, without departing from the spirit of my invention or the scope of the appended claims.

I claim:

1. Freeze concentration and separation apparatus to recover solute-free ice from solutions comprising, in combination, a cylindrical vapor tight casing having a liquid collecting bottom and a discharge outlet therein for washed ice, a plurality of cells for solute-free ice in end to end connected relation, rotatable means within said casing to move said cells in a selected direction, each cell being sector-like with angularly spaced radial walls and laterally spaced inner and outer circumferential walls, said radial walls at least diverging downwardly, said circumferential walls having a greater height than said radial walls, a gable cap extending between adjoining radial walls of adjoining cells, a perforated door adapted normally to close the bottom of each cell and to open to discharge said ice after it is washed, said door being hinged to swing about a radial axis adjacent the trailing lower edge of its cell, each door further having rollers in the front portion thereof and a rearwardly extending operating lever adapted to at least partially to reclose each said door after an opening thereof to discharge said washed ice into said discharge outlet, a cam roller adapted to engage said operating lever to cause said reclosing, annular tracks positioned within the lower part of said casing at a height to engage said rollers and maintain said doors closed in the annular path of travel of each cell except when in the position above said discharge outlet, each said door being adapted to open above said discharge outlet to discharge washed ice from its cell therethrough, a plurality of nozzles at angularly spaced stations around the upper part of said casing above said cells, one of said nozzles positioned adjacent the departure end of said discharge outlet being a defrosting nozzle adapted to spray frost-removing liquid into a freshly emptied cell therebeneath to deice the surfaces of the same, a plurality of feed slurry nozzles in the next angularly spaced relation to said defrosting nozzle from the departure end of said discharge outlet having liquid ejector mixing and freezing nozzles adapted to mix solution and liquid vaporizable refrigerant and discharge the same into the emptied space in at least one cell therebeneath as a feed slurry of solute-free ice and solution with relatively greater solute content therein, a plurality of wash liquid nozzles of decreasing solute content in the direction of movement of said cells toward said discharge outlet, means for supplying respective wash liquid of decreasing solute content to said cells during their movement between said feed slurry nozzles and said discharge outlet at rates to maintain solute-free ice in said cell substantially flooded for piston-like displacement of wash liquid of one solute content by wash liquid of lesser solute content respectively and successively, a plurality of angularly spaced compartments in said bottom to receive wash liquid of different solute contents respectively, said second-named means being operatively interconnected to move wash liquid in a general countercurrent direction to the direction of movement of said cells, means for maintaining a pool of solution of relatively greater solute content at least beneath said defrosting and feed slurry nozzles to be supplied to feed slurry nozzles, means for removing vaporized refrigerant from said casing, means for supplying solute-free liquid to at least one wash liquid nozzle at the last nozzle station toward the approach end of said discharge outlet, a sump member beneath said discharge outlet in communication with said discharge to receive washed solute-free ice, means for providing and maintaining a pumpable product slurry in said sump member and means to maintain said product slurry in mixed pumpable slurry condition preparatory to removal for operation and recovery of solute-free product in liquid phase.

2. Freeze concentration and separation apparatus for the production of washed ice from saline water comprising, in combination, a vapor tight casing having a liquid drainage bottom and a washed ice discharge outlet therein, a plurality of cells in end to end relation within said casing, each cell having circumferential and radial walls, said radial walls being divergent downwardly, a perforated door adapted normally to close the bottom of each cell and to open at said discharge outlet, track means positioned within the lower part of said casing at a height to engage and maintain said doors closed in the path of travel of each cell except above said discharge outlet, a plurality of nozzles at angularly spaced stations around the upper part of said casing above said cells, a defrosting nozzle positioned adjacent the departure end of said discharge outlet adapted to discharge relatively warmer frost-removing water into a freshly emptied cell therebeneath, another of said nozzles adjacent said defrosting nozzle in the direction of movement of said cell having a liquid ejector adapted to mix and flash saline water and liquid vaporizable refrigerant and discharge the same into the empty space in said cell therebeneath as a feed slurry of unwashed ice and relatively more concentrated saline water, and a plurality of nozzles for wash water of decreasing salt content still further in said direction of movement, means for supplying said respective wash water of decreasing salt content to said cells therebeneath at rates to maintain said ice substantially flooded for piston-like displacement of wash water of one salt content by wash water of lesser salt content, a plurality of angularly spaced compartments in the bottom of said casing below said cells to receive wash water of different salt contents respectively, said second-named means being operatively interconnected to move wash water in a general countercurrent direction to the direction of movement of said cells, and means for maintaining a pool of water of relatively greater salt content beneath said defrosting and feed slurry nozzles, means for supplying salt-free water to the nozzle at the last nozzle station in the direction of movement of said cells toward the approach end of said discharge outlet, and a sump member beneath said discharge outlet in communication therewith to receive washed ice as and when each cell door is opened above said discharge outlet.

3. Freeze concentration and separation apparatus for the production of washed ice from saline water comprising, in combination, a vapor tight casing having a liquid drainage bottom and a washed ice discharge outlet therein, a plurality of cells in end to end relation within said casing, each cell having circumferential and radial walls, said radial walls being divergent downwardly, a door adapted normally to close the bottom of each cell and to open at said discharge outlet, means positioned within the lower part of said casing at a height to engage and maintain said doors closed in the path of travel of each cell except above said discharge outlet, a plurality of nozzles at angularly spaced stations around the upper part of said casing above said cells, at least one of said nozzles adjacent said departure end of said discharge outlet in the direction of movement of said cell having a liquid ejector adapted to mix and flash saline water and liquid vaporizable refrigerant and discharge the same into the empty space in said cell therebeneath as a feed slurry of unwashed ice and relatively more concentrated saline water, and a plurality of nozzles for wash water of decreasing salt content still further in said direction of movement, a plurality of angularly spaced compartments in the bottom of said casing below said cells to receive wash water of different salt contents respectively, and means for supplying salt-free water to the nozzle at the last nozzle station in the direction of movement of said cells toward the approach end of said discharge outlet.

4. Apparatus as set forth in claim 3 in which, said cells are sector-like and in an annular rigidly connected arrangement, a carrier is adapted to rotate said cells in a horizontal plane about a central vertical axis, said circumferential walls are higher than said radial walls, at least said radial walls are downwardly divergent, said doors of said cells open at the leading edge thereof relative to the direction of movement of said cells about a hinge toward the trailing edge of said cells respectively, a member is positioned beneath said discharge outlet in communication therewith to receive washed ice as and when each cell door is opened above said discharge outlet, and means are provided to produce a flowable product slurry of washed ice and salt-free water following discharge of washed ice through said discharge outlet.

5. Apparatus as set forth in claim 3 in which, a defrosting nozzle is provided adjacent the departure end of said discharge outlet having a portion within said casing extending radially above a cell to be defrosted and downwardly facing openings in said radial portion, said wash water nozzles each having a radial portion within said casing and with downwardly facing openings in said radial portion, radially spaced arcuate shields are provided on each side of said feed slurry nozzles to assist in guiding feed slurry into a cell below said feed slurry nozzle, and a vapor outlet is provided in said casing in angularly spaced relation to said feed slurry nozzle.

6. Apparatus as set forth in claim 3 in which said bottom is frusto-conical shape, arcuate tracks comprise said first-named means and are discontinuous in the vicinity of said discharge outlet, said tracks being below said cells and doors, and a snubber is provided adjacent said discharge outlet to regulate the speed of opening of each door above said discharge outlet.

7. Freeze concentration and separation apparatus for solutions comprising, in combination, a vapor tight right circular casing having a vertical axis, the bottom of said casing being closed and shaped substantially in the form of the frustum of a cone, substantially radial divider walls in angularly spaced relation around said bottom to provide arcuate liquid drainage compartments in said bottom, a discharge opening extending through said bottom between two adjacent compartments, the initial drainage compartment adjacent the departure end of said discharge opening being of greater length than the other of said compartments and having higher divider walls, a liquid lever control for said initial drainage compartment to provide a pool reservoir relatively concentrated solution therein, means for rotating a right circular carrier in said casing above said bottom compartments, said carrier having an endless annular succession of cells, each of said cells having a perforated door closure at the bottom thereof adapted to retain solute-free ice therein and simultaneously drain liquid therefrom through said door closure, means for maintaining each said door closure closed throughout each circuit of each cell except when said door closure is above said discharge opening, a sump chamber in vapor tight communication with the interior of said casing directly below said discharge opening, means for supplying solute-free solvent to said chamber, means to mix said solute-free solvent with washed ice discharged through said discharge opening to form a flowable slurry of solute-free product specification and means to inhibit accretion and obstruction by ice in said apparatus.

8. Freeze concentration and separation apparatus for the production of washed ice from saline water comprising, in combination, a vapor tight casing having a liquid drainage bottom and a washed ice discharge outlet therein, a plurality of cells in end to end relation with said casing, means to rotate said cells, each cell having circumferential and radial walls, a door adapted normally to close the bottom of each cell and to open at said discharge outlet, means to engage and maintain said doors closed in the path of travel of each cell except above said discharge outlet, means to open each door above said discharge outlet, a defrosting nozzle positioned adjacent the departure end of said discharge outlet adapted to discharge relatively warmer frost-removing water into a freshly emptied cell therebelow, nozzle means adjacent said defrosting nozzle in the direction of movement of said cell adapted to discharge unwashed ice into said cell, a plurality of nozzles for wash water of decreasing salt content positioned at angularly spaced stations above said cells still farther in said direction of movement, means for supplying said respective wash water of decreasing salt content to said cells therebelow, a plurality of angularly spaced compartments in said bottom of said casing below said cells to receive wash water of different salt contents respectively, and means for supplying salt-free water to the nozzle at the last nozzle station in the direction of movement of said cells toward the approach end of said discharge outlet.

9. Freeze concentration and separation apparatus comprising, in combination, a casing generally toroidal in plan and tubular in cross-section, the bottom of said casing having a discharge outlet for solids and a plurality of arcuate liquid draining compartments in angular arrangement, upper and lower track means, a plurality of individual sector-like cells affixed in toroidal arrangement in plan and adapted to rotate in an endless path within said casing, said cells having support wheels which ride on the upper of said track means, each cell having at least one door adapted to ride and be held closed by the lower of said track means, said lower of said track means being so constructed and arranged as to permit each door to open when it is above said discharge outlet, feed slurry nozzle means extending through said casing to fill freshly emptied cells leaving a position above said discharge outlet, means for removing vapor from said casing, a plurality arcuately extending wash nozzle stations angularly spaced around said casing and extending therethrough above said cells and said arcuate compartments respectively, means for recirculating liquid from said respective compartments to a selected one of said wash nozzle stations and means adapted to engage said cells to rotate the same.

10. Apparatus as set forth in claim 9 in which, each said cell is provided with a pair of doors, each door being adapted to close one-half of the bottom of its cell, said doors being pivoted to open about radial hinge axes, and said last-named means being a cable engaging the outer circumference of said cells and having a loop extending to the outside of said endless path of said cells, and means to pull one side of said loop to move said cable means for said rotation of said cells.

11. Method of freeze concentration and separation of salt-free ice from saline water comprising, in combination, ejecting an admixture of liquid butane and saline water into a feed zone of lesser pressure in the neighborhood of but below atmospheric pressure and of a temperature in the neighborhood of but below the freezing temperature of salt-free water, immediately forming an endless succession of relatively stable and compact permeable columnar beds of said ice separated one from the other in said feed zone, substantially continuously draining liquid from said beds of ice and replacing it with wash water of decreasing salt content, the last said replacing being by substantially salt-free wash water, and dumping and dispersing each bed of washed ice upon completion of said washing to enable it to be removed to a place for the melting of said washed ice to recover salt-free water.

12. Method of freeze concentration and separation of salt-free ice from saline water comprising, in combination, relatively moving a succession of individual containers in an endless path to receive and wash salt-free ice in one circuit of said path, washing saline water from said salt-free ice during said one circuit, emptying said containers at the end of said one circuit into a discharge zone for the removal of washed ice therefrom respectively, spraying substantially fresh saline water against a freshly emptied container to remove frost and ice from the surfaces thereof, collecting the drainings from said freshly emptied containers so sprayed in a reservoir thereof therebeneath, feeding saline water from said reservoir to an ejector with a vaporizable liquid refrigerant for discharge into a freshly emptied and defrosted container to form a bed of salt-free unwashed ice in said container, the proportions of said saline water and liquid refrigerant being in respective proportions to freeze only a portion of said water to form a self-leveling and self-distributing feed slurry in said freshly emptied and defrosted container, and draining the liquid of said feed slurry away from said container.

13. Method as set forth in claim 12 comprising projecting said feed slurry into said freshly emptied and defrosted container with sufficient force as to prolong the contact between said liquid refrigerant and saline water to substantially complete utilization and vaporization of said liquid refrigerant, and removing vaporized refrigerant from the vicinity of said containers.

14. Method of freeze concentration and separation of salt-free ice from saline water comprising, in combination, making salt-free ice in a freezing zone by partially freezing saline water by vaporizing a vaporizable liquid refrigerant, relatively moving a succession of containers in an endless horizontal path to receive salt-free ice so made, washing saline water from said salt-free ice in said containers during one circuit of said containers respectively, downwardly draining each said container into a plurality of wash liquid receiving compartments, emptying said containers at the end of said one circuit into a discharge zone for the removal of washed ice therefrom respectively, and discharging defrosting liquid against a freshly emptied container to remove frost and salt-free ice from the surfaces thereof.

15. Method of freeze concentration and separation of solute-free ice from solution comprising, in combination, freezing solute-free ice by discharging an admixture of solution and refrigerant liquid into a spatial zone maintained at a pressure suitable for at least partially flash freezing saline water, moving a predetermined quantity of said ice as a porous bed toward a washed ice discharge zone, repetitively discharging wash liquid downwardly toward said bed of decreasing solute content, displacing wash liquid from one such discharging by wash liquid from a succeeding discharge of lesser solute content with said ice in said bed remaining sufficiently flooded throughout, said displacement occurring substantially in the nature of hydraulic displacement from above, said bed having a height sufficient for such displacement, finally washing said ice in said bed with wash liquids substantially of solute free product specification, discharging said bed of washed ice in said discharge zone, and dispersing said bed of washed ice so discharged and forming a flowable slurry of said washed ice with solvent of said solution of product specification.

16. Method of washing ice comprising, in combination, relatively moving a succession of individual containers in an endless path to receive and wash ice in one circuit of said containers respectively, washing the surface of said ice during said one circuit, emptying said containers successively at the end of said one circuit into a discharge zone for the removal of washed ice therefrom respectively, discharging liquid against a freshly emptied container to remove frost and ice from the surfaces thereof, draining said last-mentioned freshly emptied container, supplying ice to be washed into a freshly emptied and defrosted container to form a bed of ice to be washed in said container, discharging wash liquid upon the ice in each container during said circuit, and draining liquid from ice being washed in said container downwardly into a plurality of wash liquid receiving compartments.

17. Method of making and washing ice comprising, in combination, supplying ice to be washed into a freshly emptied container by discharging saline water and a vaporizable liquid refrigerant in admixture under conditions suitable to partially freeze a portion of said water by vaporizing said refrigerant, the proportions of said water and liquid refrigerant being selected to provide a self-leveling and self-distributing feed slurry to form a bed of unwashed ice in said freshly emptied container, respectively relatively moving a succession of individual containers in an endless path to receive and wash said ice within one circuit of said containers respectively along said path, discharging wash liquid upon the ice in each container during said one circuit, draining lquid from ice being washed in said container downwardly into a plurality of wash liquid receiving compartments, and emptying said containers successively at the end of said one circuit into a discharge zone for the removal of washed ice therefrom respectively.

References Cited in the file of this patent
UNITED STATES PATENTS

| | | |
|---|---|---|
| 1,976,204 | Voorhees | Oct. 9, 1934 |
| 2,020,719 | Bottoms | Nov. 12, 1935 |
| 2,150,947 | Smith | Mar. 21, 1939 |
| 3,017,752 | Findlay | Jan. 23, 1962 |

UNITED STATES PATENT OFFICE
CERTIFICATE OF CORRECTION

Patent No. 3,170,779                                   February 23, 1965

George B. Karnofsky

It is hereby certified that error appears in the above numbered patent requiring correction and that the said Letters Patent should read as corrected below.

Column 1, line 19, for "Enginering" read -- Engineering --; column 6, line 70, for "ad" read -- and --; column 12, line 13, for "lever" read -- level --; column 13, line 24, for "andless" read -- endless --.

Signed and sealed this 3rd day of August 1965.

(SEAL)
Attest:

ERNEST W. SWIDER                                   EDWARD J. BRENNER
Attesting Officer                                       Commissioner of Patents